Aug. 11, 1959 B. A. FRIES 2,899,555
APPARATUS FOR DETERMINING CHARACTERISTICS
OF HYDROGEN-CONTAINING SUBSTANCES
Filed July 23, 1953

$$\frac{d(1+H)}{2}$$

INVENTOR
BERNARD A. FRIES
BY
ATTORNEYS

United States Patent Office 2,899,555
Patented Aug. 11, 1959

2,899,555

APPARATUS FOR DETERMINING CHARACTERISTICS OF HYDROGEN-CONTAINING SUBSTANCES

Bernard A. Fries, Berkeley, Calif., assignor to California Research Corporation, San Francisco, Calif., a corporation of Delaware Application July 23, 1953, Serial No. 369,893

1 Claim. (Cl. 250—43.5)

This invention relates in general to methods and apparatus for determining a characteristic of a hydrogen-containing substance and in particular to methods and apparatus for determining such a characteristic using penetrative radiation.

It is often difficult to determine a characteristic or characteristics of a liquid or gas in a closed receptacle or in a conduit through which the substance is flowing without withdrawing a portion of the subsance for analysis. Similarly, it is difficult to determine certain characteristics, such as hydrogen content, of a sample of a solid such as a well bore core without destroying or disfiguring the sample.

It has been proposed to utilize penetrative radiation to determine the proportion of two substances in a mixture by measuring the intensity of radiation transmitted from a given radiation source through a given thickness of each of the component substances individually, and then by calculations involving the mass absorption coefficients of the individual substances, determining the proportions of the two substances in the mixture by measuring the radiation transmitted through the mixture and comparing this measurement with the individual measured intensities. This method has the disadvantage that it is only operable for a mixture having a maximum of two components and that the calculations must be made for each different mixture tested. This method has the further disadvantage that it gives no information concerning the proportion of any element in a mixture of compounds. Thus, this method is very time-consuming and has limited application.

In accordance with the present invention, a method has been devised through the use of which the determination of certain characteristics of hydrogen-containing substances may be continuously determined without access to the receptacle or conduit in which such substances are contained, and without destruction or deformation of the substances. The determination of such characteristics is substantially independent of the composition of the hydrogen-containing substance, and for a given radiation source, the method and apparatus of this invention can be utilized for testing a great variety of hydrogen-containing substances without additional calibration. In carrying out the invention, a beam of penetrative radiation is transmitted through the hydrogen-containing substance to be analyzed and a measurement made of the intensity of the beam after transmission through the substance. By correlating this intensity with the intensity of the beam after being transmitted through hydrogen-containing substances whose characteristics are known, the desired characteristics of the tested substance can be determined.

It is therefore an object of this invention to provide an improved method and apparatus for determining a characteristic of a hydrogen-containing substance utilizing penetrative radiation.

It is an additional object of this invention to provide a method and apparatus for determining selected characteristics of hydrogen-containing substances, which method and apparatus is substantially independent of the composition of such hydrogen-containing substances.

It is an additional object of this invention to provide a method for determining the hydrogen content of a hydrogen-containing substance utilizing penetrative radiation.

It is a further object of this invention to provide a method for determining the density of a hydrogen-containing substance utilizing penetrative radiation.

It is an additional object of this invention to provide an improved method for analyzing a hydrogen-containing substance by means of beta particles to determine a characteristic of the substance.

Objects and advantages other than those set forth above will be readily apparent from the following description when read in connection with the accompanying drawing, in which.

Figures 1, 2:
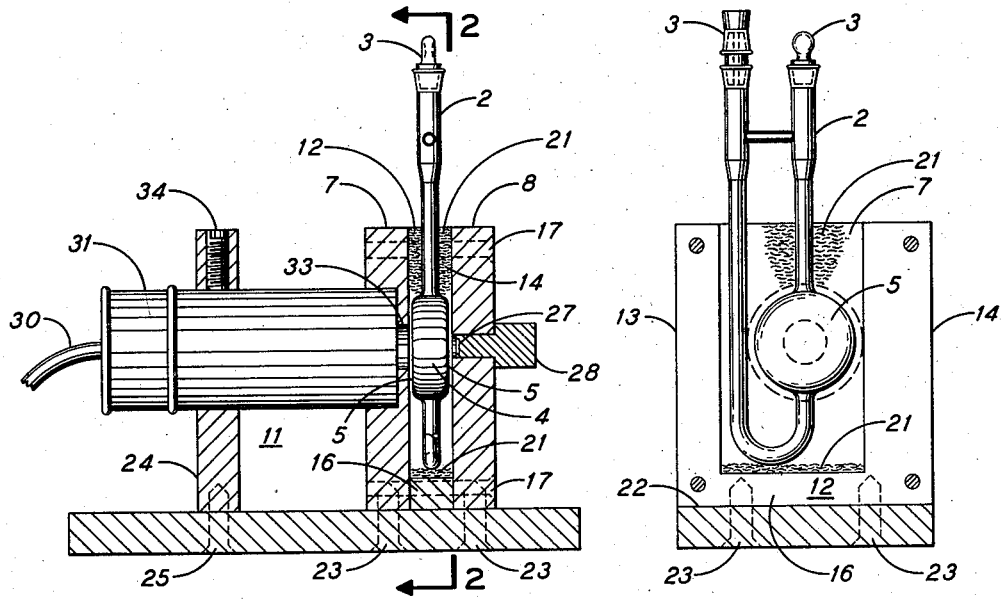
Fig. 1 is a side view, partly in section, of one embodiment of apparatus adapted to carry out the method of analysis of this invention.
Fig. 2 is a view along plane II—II of Fig. 1.

Figs. 1 and 2 illustrate apparatus suitable for determining selected characteristics of a hydrogen-containing substance on a batch basis. The substance to be analyzed may be placed in a U-shaped tube 2 of suitable material such as glass. Tube 2 is provided with removable stoppers 3 in the open ends thereof to prevent evaporation of the sample during the weighing for determination of density. Tube 2 is provided with an enlarged portion 4 in one leg thereof through which the penetrative radiation is transmitted. Enlarged portion 4 is provided with suitable windows of a material which is readily permeable by beta particles. Such windows may comprise disks 5 of beryllium, aluminum, or glass which are cemented or otherwise secured on each side of enlarged portion 4. Tube 2 is adapted to be inserted between plates 7, 8 of a test assembly 11. A U-shaped member 12 having legs 13 and 14 and a base 16 is provided between plates 7, 8 and is secured thereto by screws 17 to form a receptacle for receiving tube 2. Tube 2 may rest on base 16 or may, as shown, be maintained slightly above base 16 by layers 21 of cotton or other suitable material secured to the base 16. The sample receiving assembly comprising plates 7, 8 and member 12 is secured to a base member 22 by screws 23. Base member 22 is also provided with a detector support member 24 secured to it by screws 25.

Plate 8 is provided with an opening extending therethrough for receiving a suitable source of penetrative radiation. If beta particles are to be the radiation used, the radiation source may comprise any suitable known emitter of beta particles of the desired energy. One example of such an emitter is a mixture of the radioactive isotopes, strontium-90 and yttrium 90. The strontium-90 has a 25-year half life and emits a soft beta particle, while the decay product of strontium-90, which it yttrium-90, has a half life of 61 hours and emits 2.2 million electron volt beta particles. This emitting mixture may be in the form of a source 27 secured by lacquer or other suitable means to a recess in the end of a plug 28 which is adapted to fit into the opening in plate 8, so that source 27 is positioned adjacent to disks 5 of tube 2. Plug 28 may be urged into the position shown in Fig. 1 by suitable spring means and is provided with a shoulder portion engaging plate 8 to provide definite alignment of source 27 relative to tube 2. Since the area of disks 5 is considerably larger than the area of source 27, longitudinal movement of tube 2 in its receptacle will not affect the accuracy of the measurements. However, once tube 2 is positioned, any non-longitudinal movement of tube 2 should be prevented to avoid changing the length of the path through the tested substance in enlarged portion 4 through which the beta particles travel. Although the source of radiation has been illustrated in one position, it will be apparent that it may also be located in other positions. For example, the emitting mixture could be secured to one disk 5, either inside or outside, to transmit a beam of beta particles through the tested substance in the enlarged portion of tube 2.

Suitable radiation detecting means, such as a Geiger-Mueller tube, a scintillation counter or ionization chamber, may be provided to measure the intensity of the beam of beta particles after being transmitted through the substance in tube 2. As shown, a Geiger-Mueller tube 31 is provided having a window end extending into a circular opening in one side of plate 7 to support that end of the tube and to align tube 31 with an opening 33 in plate 7 communicating with disk 5 of tube 2. The other end of tube 31 rests on support member 24 and is firmly held thereon by a set screw 34. Tube 31 is provided with a cable or lead 30 connecting the tube to suitable amplifying and/or integrating apparatus for producing an indication of the intensity of the radiation received by tube 31.

Since the principal interaction of beta particles is with the electrons in matter, it follows that, for a given thickness of a substance, the attenuation of beta particles in passing through such a substance will be a function of the number of electrons per unit mass, or the electron density, of the substance. The electron density of an element is given by the ratio $Z/A$, where $Z$ is the atomic number of the element and $A$ is the atomic weight of the element. The electron densities of a number of the lighter elements are as follows: helium 2/4.002, carbon 6/12.010, nitrogen 7/14.008, oxygen 8/16.000, and sulfur 16/32.066. Thus, since the ratio of $Z/A$, or electron density, of these lighter elements is substantially 1/2, a given thickness of each of such elements will absorb or attenuate beta particles from a given source to substantially the same degree. However, the electron density of hydrogen is 1/1.008, or substantially 1/1, so that the absorption of beta particles by hydrogen is markedly different from the beta particle absorption of the lighter elements discussed above, and it is this unique absorption characteristic of hydrogen which is utilized in this invention to determine selected characteristics of a hydrogen-containing substance.

As stated above, assuming the simplest theoretical considerations, the absorption of beta rays by a material is a function of the number of electrons per unit area of material. For a pure hydrocarbon material, the number of electrons per unit area is directly proportional to the expression:

Milligrams/centimeter² (weight percent carbon $\times \frac{Zc}{Ac}$ + weight percent hydrogen $\frac{Zh}{Ah}$)

where

Milligrams/centimeter² is the mass per unit area of the hydrocarbon
Weight percent carbon = the percentage by weight of carbon in the hydrocarbon
$Zc$ = the atomic number of carbon
$Ac$ = the atomic weight of carbon
Weight percent hydrogen = the percentage by weight of hydrogen in the hydrocarbon
$Zh$ = the atomic number of hydrogen
$Ah$ = the atomic weight of hydrogen The mass per unit area is directly proportional to the density of the hydrocarbon for a sample of fixed thickness. The mass per unit area is also directly proportional to the weight of the hydrocarbon for a sample of fixed cross sectional area. Therefore, the expression mg./cms.² can be converted to either density, $d$, or weight, $w$, depending upon which of the two latter parameters are to be used. If it is desired to use density, $d$, since $Zc/Ac$ is substantially = 1/2, $Zh/Ah$ is substantially = 1, and weight percent carbon = 1-weight percent hydrogen, where the total weight of the substance is taken as unity, the above expression reduces to:

$$\frac{d(1+H)}{2}$$

If it is desired to use weight, $w$, the expression can be converted to:

$$\frac{w(1+H)}{2}$$

Thus, the absorption of beta rays in a hydrocarbon is a function of the quantity $$\frac{d(1+H)}{2}$$

and the quantity $$\frac{w(1+H)}{2}$$

It will be noted in the derivation of these quantities that, although a substance containing only C and H was assumed, the presence of other elements in the hydrocarban will not change the quantities as long as these other elements have ratios of $Z/A$ of substantially 1/2 and are elements of low atomic number. This is so because the other elements, having ratios of $Z/A$ of substantially 1/2 and having low atomic numbers, will attenuate the beta particles to the same extent that carbon does, so that the effect of the presence of these other elements will for all practical purposes be the same as if the other elements were carbon. Elements which are above sulfur in the periodic table will introduce errors in the accuracy of the above quantity because other interactions of beta particles with matter become important. However, most of the common impurities in hydrocarbons, such as sulfur, oxygen and nitrogen, have sufficiently low atomic numbers so that this method is especially adapted for the analysis of hydrocarbons.

Figure 3:
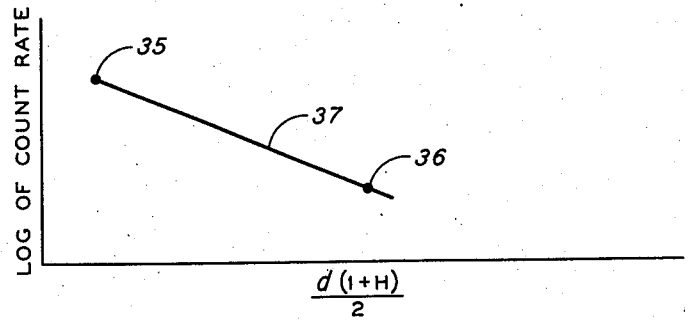
Fig. 3 is a graph illustrating relationships between the intensity of radiation transmitted through a group of hydrogen-containing substances and certain characteristics of such substances, and Fig. 4 diagrammatically illustrates one alternate embodiment of the invention applied to the continuous determination of characteristics of a hydrogen-containing substance flowing in a pipe line.

To calibrate the test apparatus for a given sample thickness, assuming that it is desired to use the quantity $$\frac{d(1+H)}{2}$$

a first hydrogen-containing substance having a known hydrogen content and a density which is known or can be determined, is inserted in tube 2, which is then placed in the sample receiving assembly with disks 5 aligned with source 27 and the window end of detector tube 31. The numerical value of the quantity $$\frac{d(1+H)}{2}$$

for the known substance is determined, using the known density and hydrogen content. The intensity of the beam of beta particles transmitted through the first known substance is measured to provide a count rate for the substance. This count rate may then be plotted, preferably on a logarithmic scale, against the numerical value obtained from the quantity $$\frac{d(1+H)}{2}$$

for the first substance, to obtain a point, such as point 35, as shown in Fig. 3.

The first substance is then removed from tube 2 and a second known hydrogen-containing substance is placed in tube 2 and a measurement of the intensity of the beam of beta particles transmitted therethrough obtained. The density and hydrogen content of the second substance must be known, and either the density or hydrogen content must differ from the corresponding values for the first known substance in order to obtain a different numerical value for the quantity $$\frac{d(1+H)}{2}$$

for the second substance. The count rate for the second substance is plotted against the numerical value of $$\frac{d(1+H)}{2}$$

for the second substance to obtain a point, such as point 36 of Fig. 3.

Additional hydrogen-containing substances of known density and hydrogen content may be similarly analyzed to obtain additional points for plotting a curve. However, I have found that for a great number of hydrogen-containing substances, the points determined by the above-described method fall substantially along a straight line, so that determination of two points of this line will suffice to obtain a sufficiently accurate curve to work with.

For example, samples of a series of hydrocarbons comprising pentane, hexane, heptane isooctane, methylcyclopentane, cyclohexane, toluene, benzene and phenyldecane were analyzed by the above-described method and the resulting points fell along a substantially straight line.

Thus, a curve 37 which is substantially a straight line may be drawn through points 35, 36 and extended somewhat along the axis of abscissa. For increasing values of the quantity $$\frac{d(1+H)}{2}$$

curve 37 will tend to curve toward the axis of abscissa, rather than continuing as a straight line, so that curve 37 cannot be extended too far along the axis of abscissa without introducing errors. Then the substance to be tested is placed in tube 2, and the intensity of the radiation transmitted through the tested substance is recorded or noted. Using this value of measured intensity, the corresponding numerical value of the quantity $$\frac{d(1+H)}{2}$$

for the tested substance may be read on the axis of abscissa. As will be seen, this quantity is a function of two variables, density and hydrogen content, and the numerical value of the quantity may be made to have significance in itself or, knowing the value of one of the two above variables, the equation may be solved to determine the value of the other variable.

It will be noted that once the calibration curve 37 is obtained for a given beta particle source and a given thickness of sample, the curve is valid for analyzing any hydrogen-containing substance, so that the composition of the analyzed substance is independent of the composition of any of the hydrogen-containing substances used in obtaining calibration curve 37. The only limitation is that the hydrogen-containing substances should not contain too great an amount of elements whose ratios of $Z/A$ are substantially less than $1/2$ or whose atomic number Z is too great.

Although the above description relates to the analysis of a hydrogen-containing substance using the quantity $$\frac{d(1+H)}{2}$$

it will be readily apparent that the quantity $$\frac{w(1+H)}{2}$$

may also be used. To use the latter quantity, the cross sectional area of the tested substance through which the radiation is transmitted is maintained constant, rather than maintaining a constant path length as when the quantity $$\frac{d(1+H)}{2}$$

is used.

Figure 4:
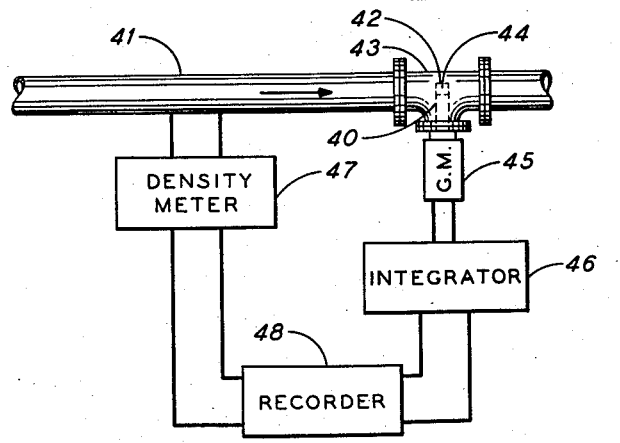

To adapt the method and apparatus of this invention to the continuous determination of a selected characteristic or characteristics of a flowing stream of hydrogen-containing fluid, the apparatus shown diagrammatically in Fig. 4 may be utilized. In Fig. 4, 41 represents a conduit such as a pipeline carrying a hydrogen-containing substance such as a hydrocarbon stream. The source of beta particles is located in any suitable position relative to conduit 41. For example, conduit 41 may be provided with a window section of beryllium or other suitable material readily penetrated by beta particles so that the beta particle source may be mounted externally of conduit 41. However, because of the relatively limited range of beta particles, when applied to fluid streams of large transverse dimensions, the source is preferably mounted inside conduit 41.

The beta particle source may comprise a plug 42 adapted to fit into pipeline 41 through a T 43 or other suitable connecting means. Plug 42 is provided with a plurality of braces or supports 40 extending into pipeline 41 to provide for positioning an emitter 44 of beta particles in a fixed location within the pipeline. Plug 42 is provided with a suitable beta particle permeable window positioned in line with emitter 44 and a detector 45 which is affixed to the T 43, as by a flanged connection, in a location outside of the walls of the conduit. Detector 45 can also be mounted inside pipeline 41, so long as the distance between emitter 44 and the detector is fixed. The fluid in conduit 41 flows around braces 40 between emitter 44 and detector 45 so that the beta particles which reach detector 45 travel through a predetermined distance in the pipeline fluid. Detector 45 is connected to an amplifying and integrating device 46 which produces an electrical output dependent upon the intensity of the radiation transmitted from the source to detector 45 through the substance in the pipeline.

Also connected to pipeline 41, preferably adjacent to emitter 44 and detector 45, is a device 47 for continuously measuring the density of the fluid in pipeline 41. Device 47 may be of any suitable known type of density meter which produces a continuous output which is dependent upon the density of the tested fluid. Device 47 preferably produces an electrical output signal having a magnitude dependent upon the density of the fluid. This output signal, together with the output from device 46, is supplied to a device 48 which correlates the two signals received, as will be described in further detail below.

If the same source, detector and sample thickness are used in the embodiment of Fig. 4 as are used in the apparatus of Figs. 1 and 2, the same calibration curve 37 may be used for both embodiments. However, to obtain maximum accuracy, the elements of Fig. 4 are preferably calibrated when in position, by running hydrogen-containing fluids of known density and hydrogen content through the pipeline and calibrating the apparatus to obtain a characteristic curve in a manner similar to that described above for Figs. 1 and 2.

After calibrating the apparatus and obtaining the characteristic curve, which will also be substantially a straight line, the substance to be analyzed is put into the pipeline. Emitter 44 transmits a beam of beta particles through the tested substance to cause detector 45 to supply to device 46 a signal dependent upon the intensity of the beam transmitted through the tested substance. Device 46 preferably converts the signal from detector 45 into an electrical signal having a magnitude dependent upon the numerical value of the quantity $$\frac{d(1+H)}{2}$$

for the tested substance. Similarly, device 47 supplies to device 48 an electrical signal which is a continuous measure of the density of the tested substance. Device 48 therefore receives two signals dependent respectively, upon the density and the numerical value of the quantity $$\frac{d(1+H)}{2}$$

By equating this quantity to the numerical value, the expression can then be solved for hydrogen content, H, by transforming to $$H = \frac{2K}{d} - 1$$

where K is the numerical value of the quantity $$\frac{d(1+H)}{2}$$

It will be seen that solution of this equation involves only subtraction and division, so that, given the values, or electrical analogs thereof, of K and d, suitable well known electrical circuits can be easily utilized to continually obtain the value, or electrical analog, of H. The value of H obtained by device 48 may be used to provide an indication on a suitable meter and/or may be continuously recorded for future reference.

If it is desired to determine the density of a hydrogen-containing substance by the method of this invention, the apparatus shown in Fig. 4 can be modified by replacing device 47 with a suitable known device for providing a continuous indication of the hydrogen content of the tested substance and device 48 can be adjusted to solve for the value of d in the equation:

$$d = \frac{2K}{1+H}$$

where K again is the numerical value of the quantity $$\frac{d(1+H)}{2}$$

Additional examples of application of the method and apparatus of this invention will readily become apparent to those skilled in the art. In many phases of petroleum refinery operations, it is often desirable to continuously know the degree to which the operation has progressed. For example, in the conversion of methylcyclohexane to toluene, it is desirable to know the percentage mole conversion during the operation. Since the percentage conversion is a function of the hydrogen content, the value of the quantity $$\frac{d(1+H)}{2}$$

is a measure of the percentage conversion. Therefore, after suitable calibration, apparatus similar to that shown in Fig. 4 may be used to continuously provide an indication of the degree to which such a conversion has progressed.

In the case of gases, the method would be useful in following hydrogenation and dehydrogenation reactions, studying the composition of recycle gases in hydroforming or platforming, and in studying the gasoline content of natural gas and the efficiency of the scrubbing of this gas for its natural gasoline content.

Although the embodiments described thus far have been in connection with the analysis of hydrogen-containing fluids, the method and apparatus of the invention are equally applicable to the analysis of hydrogen-containing solids. For example, this invention would be useful for analyzing coal, oil shale or core samples for total hydrogen content. To analyze such solids, apparatus similar to that shown in Figs. 1 and 2 may be utilized except that an open vessel can be utilized as a sample holding chamber, since evaporation of the tested substance would not be a problem. For such an analysis, it is probably more convenient to use the quantity $$\frac{w(1+H)}{2}$$

since the weight of a solid is more readily determinable than its density.

I claim:

Apparatus for determining the hydrogen content of a hydrogen-containing substance comprising a source of beta particles mounted to transmit a beam of beta particles over a predetermined path in said substance, a radiation detector mounted adjacent to said substance on the opposite side thereof from said source for producing a first output signal dependent upon the intensity of the beam of beta particles transmitted through said substance, an integrating device connected to said detector for converting said output signal into a second output signal dependent upon the numerical value of the quantity $$\frac{d(1+H)}{2}$$

for said substance, where d is the density of the substance and H is the hydrogen content of said substance expressed as a percentage of unity, a density meter positioned in contact with said substance to produce a third output signal dependent upon the density of said substance, and correlating means connected to said density meter and said integrator for correlating said second and said third output signals to provide an indication of the hydrogen content of said substance.

References Cited in the file of this patent

UNITED STATES PATENTS

| | | |
|---|---|---|
| 2,487,797 | Friedman et al. | Nov. 15, 1949 |
| 2,534,352 | Herzog | Dec. 19, 1950 |
| 2,613,325 | Herzog | Oct. 7, 1952 |
| 2,613,326 | Herzog | Oct. 7, 1952 |
| 2,757,290 | Jacobs et al. | July 31, 1956 |
| 2,781,453 | Belcher et al. | Feb. 12, 1957 |